United States Patent [19]

McLane

[11] Patent Number: 5,117,616
[45] Date of Patent: Jun. 2, 1992

[54] MULCHING LAWN MOWER

[76] Inventor: Frank E. McLane, 79665 Kingston Dr., Burmuda Dunes, Calif. 92201

[21] Appl. No.: 557,130

[22] Filed: Jul. 23, 1990

[51] Int. Cl.$^5$ .................. A01D 34/60; A01D 67/00
[52] U.S. Cl. ..................................... 56/175; 36/320.2
[58] Field of Search ............... 56/17.5, 17.3, 16.7, 56/13.3, 320.1, 320.2

[56] References Cited

U.S. PATENT DOCUMENTS

| | | | |
|---|---|---|---|
| 2,957,295 | 10/1960 | Brown | 56/17.5 X |
| 4,189,903 | 2/1980 | Jackson et al. | 56/17.5 X |
| 4,326,370 | 4/1982 | Thorud | 56/17.5 X |
| 4,466,235 | 8/1984 | Cole | 56/17.5 X |
| 4,631,909 | 12/1986 | McLane | |
| 4,835,952 | 6/1989 | McLane | |
| 4,890,446 | 1/1990 | Israel | 56/17.5 |
| 4,951,449 | 8/1990 | Thorud | 56/17.5 X |

OTHER PUBLICATIONS

Timothy Bakke, *What's New Outdoor Tools*, Popular Science, Aug. 1990, p. 22.
Phillip E. Colbaugh, *Recycle Clippings*, Grounds Maintenance, May 1990, pp. 12–13.
Holly Gibson, *Mulching Mowers*, Grounds Maintenance, May 1990, pp. 14, 16, 20 and 98.
Steven Wilson, *Equipment Test, Mulching Mower*. Popular Mechanics, Jun. 1990, p. 102.
Sears Craftsman®, Mulching Mower, *The Natural Way to Mow*, Brochure, Mar. 1990.
Troy-Bilt®, Mulching Mower, Advertisement Postcard, Garden Way Inc., 1990.
Bolens®, Mulching Mower, Advertisement, The Family Handyman, Apr. 1990, p. 43.

*Primary Examiner*—Ramon S. Britts
*Assistant Examiner*—Nancy P. Connolly
*Attorney, Agent, or Firm*—Knobbe, Martens, Olson & Bear

[57] ABSTRACT

A mulching rotary lawn mower which returns cut grass particles into a lawn wherein the mower is designed with an open air flow system. The mower comprises a rotary blade pivotally mounted beneath a deck. The deck includes an opening therein, providing an outlet for air drawn beneath the deck by the rotating blade and the grass clippings which are cut by the blade. A curved deflector is positioned proximate the blade to redirect the air and grass clippings exiting the opening. The air and clippings are redirected back beneath the deck, where the air drawn beneath the deck raises the clippings toward the blade where they are cut into tiny particles driven into the lawn and soil below.

1 Claim, 3 Drawing Sheets

MULCHING LAWN MOWER

FIELD OF THE INVENTION

The invention relates to rotary lawn mowers, and, in particular, to a "mulching" rotary lawn mower which returns grass clippings into the lawn, as opposed to accumulating the clippings in a grass catcher.

BACKGROUND OF THE INVENTION

Rotary lawn mowers in use today commonly comprise a motor-driven rotary blade which cuts grass into clippings as the mower is moved over the surface of a lawn. The clippings are then typically directed toward a grass catcher which collects the cut grass, or are dispersed directly onto the lawn. After mowing, the clippings are usually removed from the catcher, bagged, and disposed of as garbage. These bags filled with grass clippings comprise a large percentage of waste added to landfills each week. During the growing season, this percentage can be as high 50% in municipal landfills. In addition to creating added waste, the grass clippings carry lost fertilizer which must be replaced at added time and expense to the homeowner or landscaper.

Mulching lawn mowers have been developed in an attempt to alleviate the above-mentioned problems associated with discarded grass clippings. Mulching lawn mowers operate by cutting the grass clippings into fine particles which are returned into the lawn. The particles rapidly decompose, returning nitrogen and moisture to the soil and providing nutrients which fertilize the growing lawn. Furthermore, mulching mowers result in substantial savings in the time and effort required to mow the lawn, as the time-intensive chores of raking, bagging, and other clean-up of the cut grass are eliminated.

Optimum performance of mulching lawn mowers requires that the grass clippings be cut small enough to be deposited deep within the grass and soil below. In previous mowers, this was often attempted by using the vacuum created under the deck of the mower by the rotating blade to lift the cut grass clippings above the surface of the lawn where they are recut into small particles by the mower blade. However, previous rotary mulching mowers have not generated sufficient suction beneath the deck to keep the grass clippings suspended above the lawn. This results in much of the grass being cut only once, leaving behind large grass clippings on the surface of the lawn.

Some prior art mowers incorporate high-dome decks which redirect the cut grass particles over the top of the blade. However, in addition to the problems associated with poor vacuum, this type of design also creates random air flow pattern proximate the blade which can prevent grass clippings from being recut before falling to the ground. The shortcomings of prior mulching mowers are compounded when used on wet grass. Wet grass is often too heavy to be lifted by the minimal suction underneath the deck and, subsequently, is not cut by the rotary blade. As a result, manufactures have recommended that their mulching mowers only be used on dry grass.

SUMMARY OF THE INVENTION

The present invention provides a mulching lawn mower which repeatedly cuts the grass clippings into fine particles which are then returned to the lawn. The mower comprises a deck which covers a rotating blade. The present mower incorporates a unique open air flow system to create a strong vacuum under the deck. Unlike prior designs, the deck includes an opening therein to provide an outlet for air drawn underneath the deck by the rotating blade. A deflector is positioned outside the deck, adjacent the opening, and recirculates the air drawn beneath the deck so that the air exiting the opening is redirected under the deck. With the open air system of the present invention, a strong vacuum is created beneath the deck, ensuring effective mulching of grass and leaves.

In addition to redirecting the air flow through the mower, the deflector further redirects grass cut by the blade which is entrained in the airflow exiting the opening. The opening is preferably horizontally offset from a central axis of the deck to account for the exit angle of the grass caused by the centrifugal force of the rotating blade. The deflector is positioned to deflect the exiting grass clippings downwardly where they are either driven deep into the lawn or drawn back under the deck by the vacuum and cut into smaller pieces in the same manner as freshly cut grass. The clippings are redirected through the mower until they are cut small enough to be driven deep into the lawn and are no longer drawn in by the vacuum.

In the preferred embodiment, the rotary blade comprises a high lift blade having angled portions located at each end of a substantially horizontal portion. The deck preferably comprises a cover integrally formed with a circumferential skirt. The blade is exposed beneath the deck to permit contact with the grass. A plurality of front and rear wheels suspend the deck above the grass. The deflector preferably comprises a curved plate and is positioned between the front wheels, proximate the opening in the deck, so as to redirect the air and grass exiting the opening downwardly and back under the deck. The space between the deck and the deflector forms a recirculation chamber for grass clippings cut by the blade. The cover of the deck is raised proximate the opening in a unique configuration to account for the upward force component and allow additional volume for the exiting clippings. The ends of the deflector are covered by substantially vertical plates which protect the front wheels from grass clippings which may become clogged in and around the wheels during operation of the mower.

DETAILED DESCRIPTION OF THE INVENTION

Figure 1:
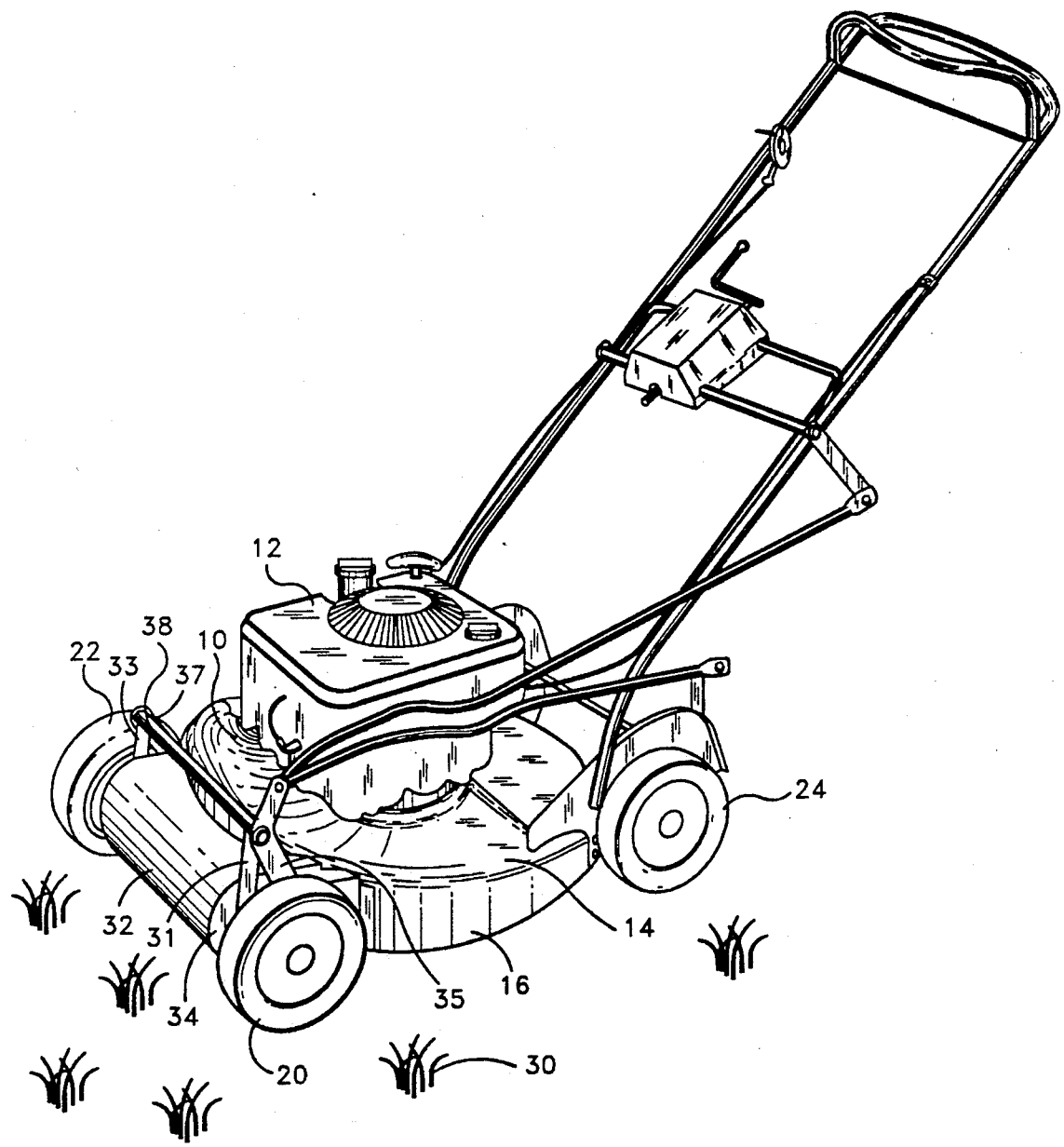
FIG. 1 is a top perspective view of the mulching lawn mower of the present invention.

A rotary lawn mower in accordance with the present invention is shown in perspective in FIG. 1. The mower includes a deck 10 upon which is mounted a motor 12. The deck 10 comprises a substantially horizontally oriented cover 14 integrally formed with a circumferential skirt 16 depending downwardly from the cover. Two front wheels 20, 22, and two back wheels 24, 26, suspend the deck 10 above the surface of a lawn, generally designated 30. A deflector 32 is attached to the deck 10 and extends between the two front wheels 20, 22. The deflector 32 comprises a single plate which is substantially planar and horizontally oriented at the top where attached to the deck 10, and then curves downwardly.

The sides 34, 36 of the deflector 32 are formed as substantially vertical plates positioned adjacent the front wheels 20, 22. The defector 32 can be formed integrally with the deck 10 or manufactured as a separate piece removably attached to the deck 10 with bolts, screws, or the like. A crossbar 38 extends above the deflector 32 and is mounted to the front wheels 20, 22 via two side bars 31, 33. Two braces 35, 37 are attached to the ends of the crossbar 38 and positioned intermediate the side bars 31, 33 and front wheels 20, 22. The crossbar 38, side bars 31, 33, and braces 35, 37, are part of a height adjustment mechanism such as that disclosed in U.S. Pat. No. 4,835,952, and incorporated herein by reference, used to raise and lower the height of the wheels 20, 22, 24, 26 relative the deck 10.

Figure 2:
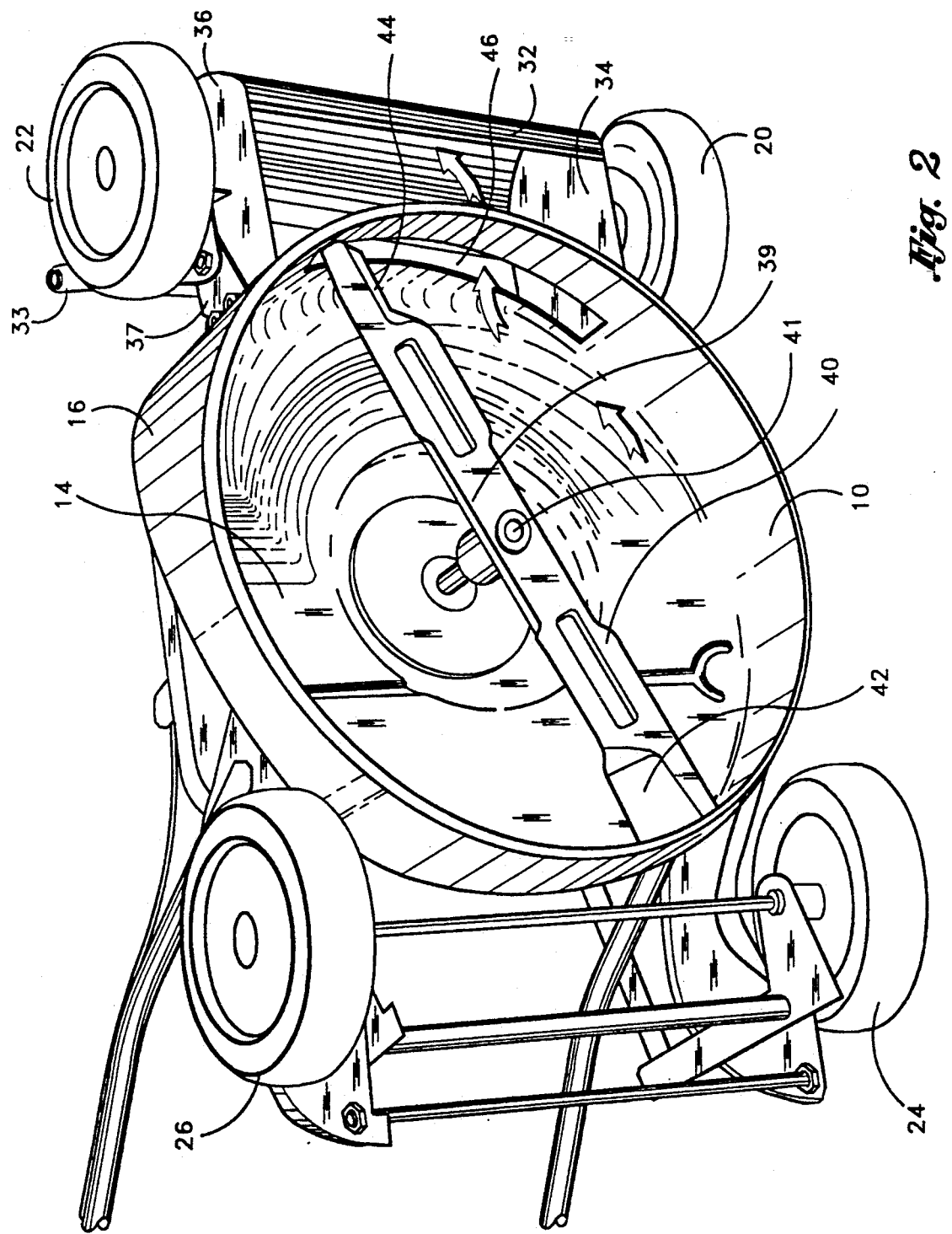
FIG. 2 is a bottom perspective view of the mower.

As shown in FIG. 2, a rotary blade 39 driven by the motor 12 is positioned under the cover 14 and surrounded by the skirt 16. The blade 39 is exposed beneath the deck 10 to enable the blade 39 to come into contact with the lawn 30. The blade 39 is preferably a standard high-lift blade comprising a substantially horizontal, central portion 40 fixed to a drive shaft 41 about which the blade 39 rotates. The blade 39 includes two angled portions 42, 44 located at either end of the horizontal portion 40. Each angled portion 42, 44 makes an angle of approximately 40° with the horizontal portion 40.

Figure 3:
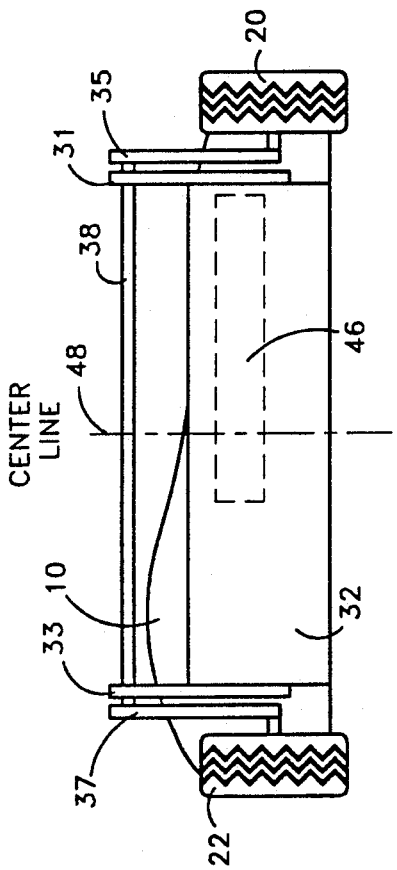
FIG. 3 is a partial front view of the mower illustrating the location of the outlet.

Referring to FIG. 2 and FIG. 3, a substantially rectangular opening 46 is formed in the skirt 16 of the deck 10, adjacent the deflector 32. Preferably, the opening is 2.25 inches high by 10 inches long. As shown, the opening 46 is horizontally offset from a central vertical axis 48 of the deck 10 and deflector 32. The opening 46 serves to provide an outlet for air which is drawn beneath the deck 10 during operation of the mower, thus creating an open-air system. As described in detail below, the opening 46 further serves as an outlet for grass clippings cut by the rotary blade 39.

Figure 4A:
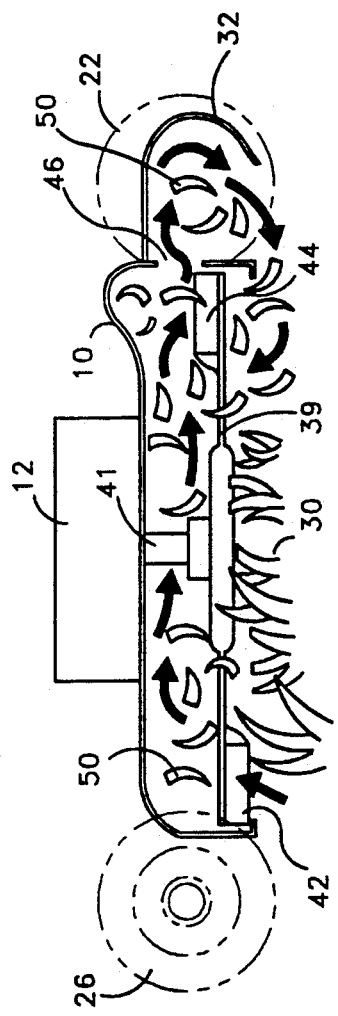
FIGS. 4a and 4b are schematic cross-sectional side elevations illustrating the flow directions of air and grass in the mower.
Figure 4B:
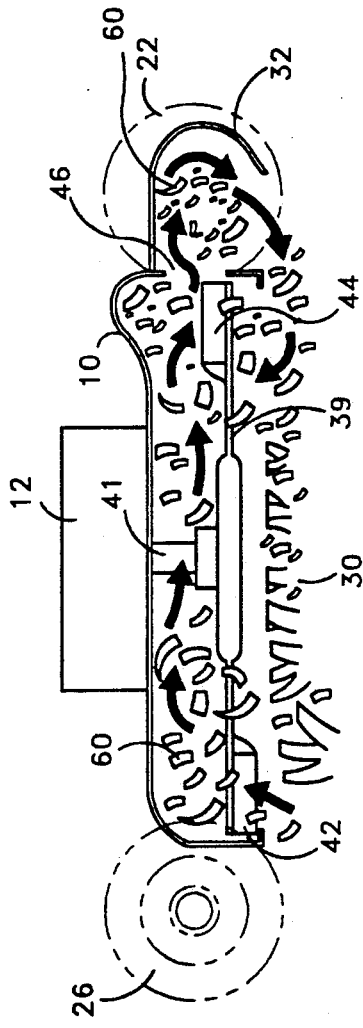

The operation of the mower is illustrated schematically in FIGS. 4a and 4b. As the blade 39 rotates about the shaft 41, counterclockwise when viewed from below, blades of grass on the lawn 30 are cut, producing grass clippings 50. The rotating blade 39 and angled portions 42, 44 produce a vacuum which acts to draw air under the skirt 16 and up above the blade 39, toward the cover 14. The grass clippings 50 are carried with the air flow and lifted above the blade 39. The centrifugal force produced by the blade 39 as it rotates causes the air and grass clippings 50 to be forced in an upward, angled direction toward the opening 46 in the deck 10. The opening 46 provides an outlet for both the air drawn beneath the deck 10, and the circulating clippings 50 entrained in the air mass. The opening 46 in the deck 10 is horizontally offset from the central vertical axis 48 in the direction of exit to maximize removal of the clippings 50. The cover of the deck 10 is raised proximate the opening 46 to account for the upward force component and allow additional volume for the exiting clippings 50.

As indicated by the arrows, air and grass clippings 50 exiting the opening 46 are redirected by the deflector 32. The curvature of the deflector 32 directs the exiting clippings 50 and air downwardly toward the bottom of the defector 32. Preferably, the deflector 32 begins to curve from the substantially horizontal portion with a radius of curvature of approximately 3.5 inches and is blended to a tighter radius of approximately 2.5 inches at the bottom. While the shape of the deflector 32 may be varied, too small a radius of curvature at the bottom will trap the grass clippings and prevent them from exiting the deflector 32. Furthermore, too large a radius of curvature at the bottom of the deflector 32 will prevent the clippings from being recirculated under the deck 10. The bottom edge of the deflector 32 is spaced horizontally approximately 3 inches away from the deck 10 at the central axis 48 to allow sufficient space for the clippings 50 to be directed back underneath the deck 10. The bottom edge of the deflector 32 terminates at a tangent angle of approximately 42 from the horizontal and is at the same height above the ground as is the bottom edge of the skirt 16. The substantially vertical sides 34, 36 of the deflector 32 act to prevent the redirected clippings 50 from becoming clogged in and around the front wheels 20, 22.

The redirected grass clippings 50 are drawn beneath the deck 10 and raised toward the blade 39 by the vacuum and are cut into smaller pieces. This process of cutting and redirecting the cut pieces continues until the grass is cut into fine particles 60, shown in FIG. 4b, which are driven back into the lawn 30 to a sufficient depth so that the vacuum created by the blade is unable to draw the particles out. The particles then decompose, providing nutrients which fertilize the lawn 30 and soil below.

Thus, the mower of the present invention establishes an open system for air flow through the mower which allows a much stronger vacuum to be created beneath the deck 10. This design ensures that the clippings 50 produced by the blade 39 and redirected by the deflector 32 are recut small enough to be driven into the lawn 30, and are not left as large clippings on the surface of the lawn 30. In addition, the open air system creates sufficient air flow so that the mower can be operated while standing still. Furthermore, the open air system enables the mower to be used successfully on wet grass. The vacuum produced beneath the deck 10 has sufficient strength to lift the heavier wet grass cuttings above the blade 39 and carry them out the opening 46. In addition to grass, the mower also operates as described above to cut leaves and other lawn debris into a fine mulch subsequently deposited on the lawn 30.

Although the invention has been described with reference to specific embodiments, the description is intended to be illustrative of the invention and is not intended to be limiting. It will be apparent to those skilled in the art that numerous modifications, such as the shape and location of the deflector and the opening, could be made without departing from the true spirit and scope of the invention as defined in the appended claims.

What is claimed is:

1. A rotary lawn mower for cutting grass on a lawn, said mower comprising:

a motor;

a rotating blade driven by said motor, said blade comprising a substantially horizontal portion and an angled portion located at each end of said horizontal portion;

a deck which supports said motor, said deck comprising a cover having a circumferential skirt, said blade rotatably mounted beneath said cover and surrounded by said skirt, said blade exposed beneath said cover to permit contact with said grass, wherein the rotation of said blade; produces a vacuum beneath said deck, said deck including an opening in said skirt providing an outlet for grass clippings cut by said blade a plurality of front and rear wheels which suspend said deck above said lawn; and a deflector mounted to said deck, said deflector comprising a plate extending between said front wheels proximate said opening in said skirt, said deflector positioned to deflect said grass clippings exiting through said opening downwardly so as to be drawn beneath said deck by said vacuum, permitting further cutting of said clippings.

* * * * *